United States Patent [19]

Berger

[11] 4,349,512
[45] * Sep. 14, 1982

[54] NON-POLLUTING TREATMENT OF ALKALINE URANIFEROUS EFFLUENTS CONTAINING $SO_4^=$ IONS

[75] Inventor: Bernard Berger, Tassin La Demi Lune, France

[73] Assignee: Pechiney Ugine Kuhlmann, Paris, France

[*] Notice: The portion of the term of this patent subsequent to Dec. 15, 1998, has been disclaimed.

[21] Appl. No.: 6,332

[22] Filed: Jan. 25, 1979

[30] Foreign Application Priority Data

Feb. 8, 1978 [FR] France .............................. 78 04192

[51] Int. Cl.³ .......................................... C01G 43/01
[52] U.S. Cl. .................................. 423/7; 423/15; 423/260
[58] Field of Search .................... 423/7, 15, 260

[56] References Cited

U.S. PATENT DOCUMENTS

| | | | |
|---|---|---|---|
| 2,863,717 | 12/1958 | Kunin | 423/7 |
| 2,900,227 | 8/1959 | Dancy et al. | 423/7 |
| 2,982,605 | 5/1961 | Mouret et al. | 423/7 |
| 3,000,696 | 9/1961 | Teichmann | 423/7 |
| 3,445,201 | 5/1969 | Wheelwright | 423/7 |
| 3,961,027 | 6/1976 | Crossley | 423/7 |

FOREIGN PATENT DOCUMENTS

| | | | |
|---|---|---|---|
| 1373734 | 12/1964 | France | 423/7 |
| 775415 | 5/1957 | United Kingdom | 423/7 |

Primary Examiner—Edward A. Miller
Attorney, Agent, or Firm—McDougall, Hersh & Scott

[57] ABSTRACT

A cyclic process for the treatment of a uraniferous liquor containing, in addition to the desired metal, sodium carbonate and/or bicarbonate and sodium sulphate, obtained by the alkaline attack of a sulphur-containing uraniferous ore, the said process comprising the neutralization of the uraniferous liquor then the fixation of the uranium and the $SO_4^=$ ions over a strong anion-exchange resin, the elution thereof with an ammonium carbonate and/or bicarbonate solution in the form of an ammonium uranyl carbonate which is subsequently decomposed and ammonium sulphate, the precipitation and the calcination of the precipitated uranates and/or diuranates with regeneration of the eluent solution of ammonium carbonate and/or bicarbonate, the causticiation of the liquor freed from uranium which leaves the anion-exchange resin to eliminate the $SO_4^=$ ions in calcium form, recycling a carbonated and/or bicarbonated liquor which is free from $SO_4^=$ ions to the attack of the ore, finally the regeneration of the elution liquor of the $SO_4^=$ ions and of the uranium.

16 Claims, 1 Drawing Figure

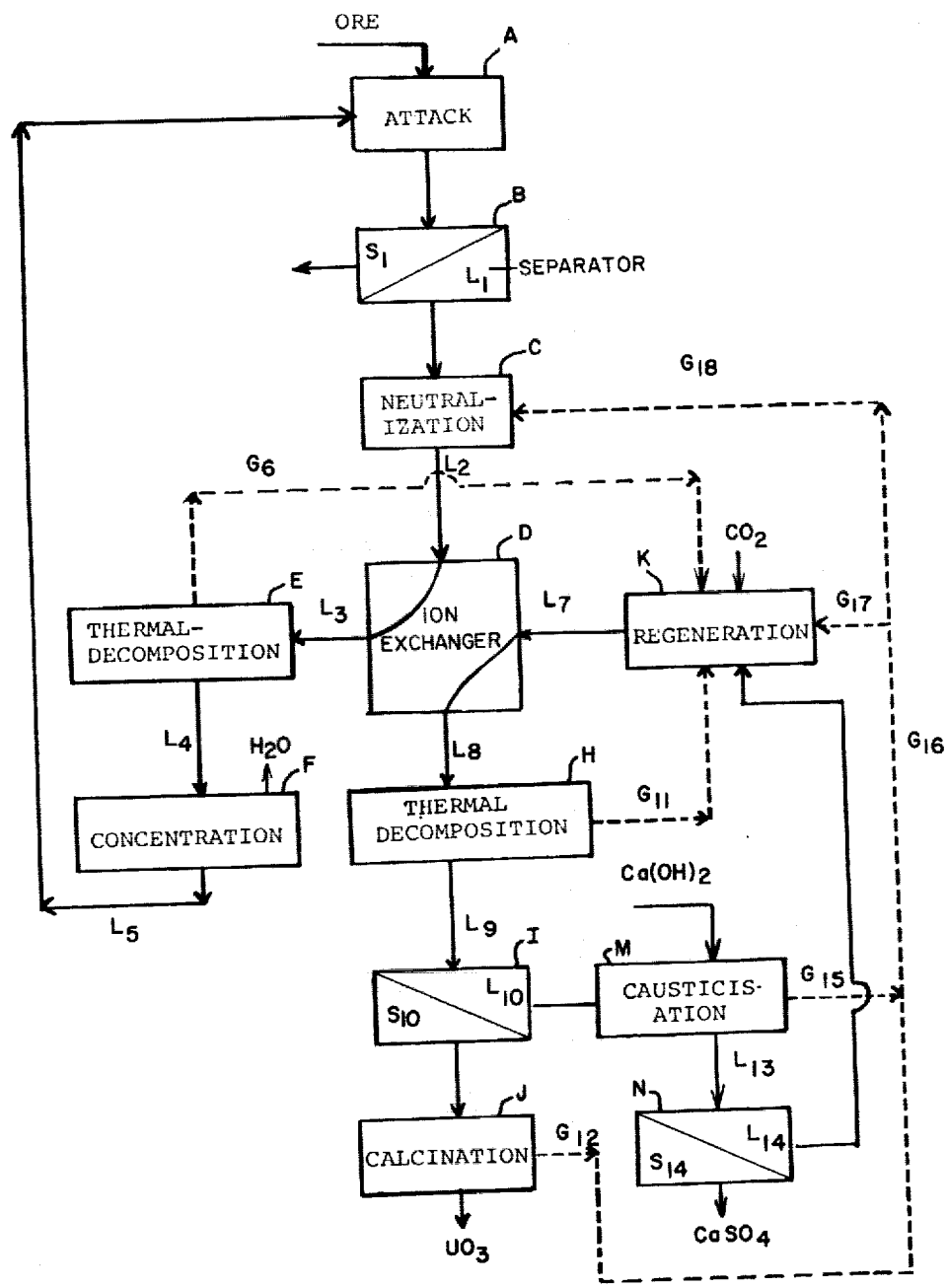

NON-POLLUTING TREATMENT OF ALKALINE URANIFEROUS EFFLUENTS CONTAINING $SO_4^=$ IONS

The invention relates to a new process for the non-polluting treatment of uraniferous effluents originating from the alkaline attack of a sulphur-containing uranium ore which, on the one hand, allows the uranium and the $SO_4^=$ ions contained in these effluents to be extracted and also allows the only alkaline carbonates and/or bicarbonates used to be recycled to the attack of the ore and, on the other hand, allows the mixture of uranium and the $SO_4^=$ ions extracted simultaneously to be separated in order to obtain virtually pure uranium in the form of an oxide.

It has already been known for many years to dissolve the uranium contained in certain ores by means of an aqueous solution of alkaline carbonates and/or bicarbonates, to pass the liquor obtained after attack over a strong anion-exchange type resin so as to fix the uranium on the said resin, then after passing the liquor over, to recover the attacking liquor, freed from its uranium and essentially containing excess alkaline carbonates and/or bicarbonates. The fixed uranium was then eluted over the resin by means of a solution of alkaline, or possibly ammonium, carbonates and/or bicarbonates and consequently precipitated in the form of ammonium uranyl tricarbonate or again in the form of ammonium or sodium diuranates according to the various processes described very widely in the specialist literature.

However, when the uraniferous ore contained sulphur, all or part of this sulphur was converted into sulphate during the attack and the sulphate passed into a solution. Once the uranium has been extracted from the liquor originating from the attack by means of an ion-exchange resin, the majority of the sodium sulphate remained in solution in the liquor which had been freed from uranium.

Consequently, it was no longer possible to recycle to the attack the liquor which is free from uranium and which contains in solution the alkaline carbonates and/or bicarbonates which had not reacted with the uranium during the attack of the ore.

Thus, the economical solution obtained involved throwing this liquor into the environment when it contained sodium sulphate. However, the liquor represented a considerable threat to the environment when thrown away, to such an extent that the various national laws have forbidden the practice.

Faced with such a situation, the applicants in pursuing their research have found and developed a new process for the treatment of a uraniferous liquor originating from the attack of a sulphur-containing ore which, by means of a novel combination of known means, successively allows the uranium and the $SO_4^=$ ions contained in this liquor to be isolated simultaneously, the uranium to be separated from the $SO_4^=$ ions later on and a solution of alkaline carbonates and/or bicarbonates to be obtained, which can be recycled to the attack of the ore.

Generally speaking, the process according to the invention is characterised by the following stages:

(a) Neutralising the uraniferous liquor originating from the attack, containing in solution, in addition to the desired metal, a mixture of alkaline carbonates and/or bicarbonates as well as sodium sulphate, using ammonia gas or again using an ammoniacal liquor in order to convert the $HCO_3^-$ ions possibly present into $CO_3^=$ ions.

(b) Passing the neutralised uraniferous liquor over an anion-exchange resin which is strong, medium strong or weak, but preferably strong, of the quaternary ammonium type in carbonated or bicarbonated form at a temperature between the ambient temperature and 60° C.

(c) Recovering the liquor which has been freed from uranium and the $SO_4^=$ ions.

(d) Eluting the uranium and the $SO_4^=$ ions fixed by a solution containing an ammonium carbonate and/or bicarbonate at a temperature between the ambient temperature and 60° C. in the form of a carbonated complex of the $UO_2(CO_3)_3(NH_4)_4$, and ammonium sulphate.

(e) The thermal decomposition of the solution containing the carbonated uraniferous complex and the $SO_4^=$ ions at its boiling temperature, causing the precipitation of the uranium in the form of ammonium uranate or diuranate, with liberation of all the $CO_2$ and a proportion of the ammonia gas in the presence of water vapour, subsequently regenerated in order to reconstitute the ammonium carbonate and/or bicarbonate.

(f) Separating the uranium precipitate and the liquor no longer containing ammonium sulphate.

(g) Taking up the ammonium sulphate liquor for a subsequent causticization treatment.

(h) Calcination of the uranium precipitate at a temperature of at most 400° C. under the conditions known to the skilled man and liberation of ammonia gas which is passed in part into the ammonium carbonate and/or bicarbonate regeneration unit, as well as neutralisation of the liquor originating from the attack.

(i) Obtaining $UO_3$ in the virtually pure state.

(j) Causticization of the liquor charged with ammonium sulphate using lime with precipitation of calcium sulphate and liberation of ammonia gas, recycled in part for the neutralisation of the liquor originating from the attack and to the ammonium carbonate and/or bicarbonate regeneration zone and the obtaining of a suspension of calcium sulphate in an ammoniacal liquor.

(k) Recovering the calcium sulphate and the ammoniacal liquor recycled to the regeneration zone.

(l) Thermal decomposition of the liquor at its boiling temperature, freed from uranium and the $SO_4^=$ ions and containing a mixture of ammonium and sodium carbonates and/or bicarbonate with liberation of all the ammonia gas and a proportion of $CO_2$ originating from the ammonium carbonates and/or bicarbonates in the presence of water vapour, subsequently regenerated in order to reconstitute the ammonium carbonate and/or bicarbonate.

(m) Concentrating the liquor originating from the decomposition and containing only alkaline carbonates and/or bicarbonates in such a way that its content of dry materials is between 150 g/l and the saturation point at the temperature of the medium, thus allowing it to be recycled to the attack of the ore.

Since the applicants have observed that the affinity of the $SO_4^=$ ions for the anion-exchange resins increased with pH of the solution, it has been found worthwhile to neutralise the liquor emanating from the attack of the ore and freed from the sterile materials using an ammonia gas or using an ammonia gas or using an ammoniacal solution to allow the $HCO_3^-$ ions to be converted in $CO_3^=$ ions.

The liquor neutralised in this way is treated, as is well known, over an anion-exchange resin which is strong, fairly strong or weak, preferably strong of the carbonated or bicarbonated quaternary ammonium type, since the affinity of the $UO_2^=$ ions in a rather complex form and $SO_4^=$ is stronger with regard to the resins of the latter type. Consequently, these ions fix on this resin in the form of uranyl carbonate ions and $SO_4^=$ which can subsequently be eluted using an ammonium carbonate and/or bicarbonate solution having a concentration of between 1 and 2.5 M in the form of ammonium uranyl carbonate and ammonium sulphate.

The liquor originating from the elution of the uranyl carbonate ions and the $SO_4^=$ ions is then thermally decomposed. This thermal decomposition is important in itself because it allows the uranium to be precipitated quantitatively in the form of ammonium uranate or diuranate, the volatile $NH_3$ and $CO_2$ compounds to be liberated and recycled to a regeneration zone where the ammonium carbonate and/or bicarbonate used for the elution of the uranium and the $SO_4^=$ ions are synthesised in a known manner and a suspension of ammonium uranate or diuranate in a liquor containing ammonium sulphate to be collected.

Although the uranium can be collected in the form of ammonium uranate or diuranate, it may be desirable to convert it by calcination into the form of $UO_3$, thus allowing total recovery, apart from losses, of the ammonia gas used in the entire uranium production cycle.

The liquor containing the ammonium sulphate is then treated with the lime in order to precipitate the calcium sulphate which, after filtration and rinsing, can be thrown out without polluting the environment, and to liberate the majority of the combined ammonia gas which is recycled in parts for the neutralisation of the liquor originating from the attack and to the ammonium carbonate and/or bicarbonate regeneration zone.

The unliberated ammonia gas and the liquor originating from the filtration of the calcium sulphate are recycled to the ammonium carbonate and/or bicarbonate regeneration zone.

With regard to the liquor which is freed from uranium and the $SO_4^=$ ions, it is thermally decomposed to allow the recovery of all the ammonia gas and a proportion of the $CO_2$ gas corresponding to the ammonium carbonate formed during the prior neutralisation and the obtaining of a liquor containing only alkaline carbonates and/or bicarbonates.

Consequently, it becomes possible to recycle this liquor to the attack of the ore once its alkaline carbonate and/or bicarbonate concentration has been brought to the value desired for the said attack.

Thus, the process according to the invention which is a continuous process has turned out to be of particular value since it involves extracting and collecting uranium from the starting ore, throwing out only the sterile materials and the sulphur initially contained in the ore in the form of a calcium sulphate, the said compounds being particularly inert with regard to the environment.

The process according to the invention will be understood better with reference to the FIGURE which illustrates an embodiment.

The sulphur-containing uraniferous ore and the attacking liquor $L_5$ which has been recycled are introduced into the attacking container A. The pulp obtained is separated at B into a cake $S_1$ and a liquor $L_1$ containing uranium in soluble form, a mixture of alkaline carbonates and/or bicarbonates as well as sodium sulphate emanating from the alkaline degradation of the mineral or organic sulphides. The cake $S_1$ resulting from the separation is washed and then extracted from the cycle. It is constituted essentially by siliceous compounds and by certain impurities which are insoluble in the attacking medium.

The uraniferous liquor $L_1$ is passed into C where it is neutralised with ammonia gas $G_{18}$ in order to convert the $HCO_3^-$ ions into $CO_3^=$ ions.

The neutralised uraniferous liquor $L_2$ is carried to D where the uranium and the $SO_4^=$ ions are fixed on the anion resin in carbonate or bicarbonate form at a temperature between the ambient temperature and 60° C.

The liquor $L_3$, which is free from uranium and the $SO_4^=$ ions but which still contains the alkaline carbonates and/or bicarbonates in solution, is collected at the outlet of D.

A liquor $L_7$ containing ammonium carbonate and/or bicarbonate in solution is introduced at D where the fixed uranium and $SO_4^=$ ions are eluted by it at a temperature between the ambient temperature and 60° C. in the form of a carbonated uraniferous complex and ammonium sulphate.

At the outlet of D, the liquor $L_8$ containing the uranium in the form of the above-mentioned complex and the $SO_4^=$ ions is introduced at H where the uraniferous complex is thermally decomposed at the boiling temperature of the liquor, causing the precipitation of an ammonium uranate or diuranate as well as the liberation of all the $CO_2$, of part of the ammonia and water vapour, thus forming the mixture $G_{11}$ which is sent toward K in order to regenerate the carbonate and/or bicarbonate required for the elution of the uranium and the $SO_4^=$ ions.

The fraction $L_9$ also leaving H is, in fact, a suspension containing a solid phase formed by ammonium uranate or diuranate and a liquid phase, an aqueous liquor containing ammonium sulphate in solution.

The two phases are then separated at I into a cake $S_{10}$ formed by ammonium uranate or diuranate crystals and a liquor $L_{10}$ which is subsequently intended to be freed from the $SO_4^=$ ions.

The crystals forming the cake $S_{10}$ are introduced into a calcination zone J where the ammonium uranate or diuranate is thermally decomposed under the conditions known to the skilled man, giving a precipitate of $UO_3$ which is collected and ammonia gas $G_{12}$ which will subsequently be combined with $G_{15}$ to form the gaseous fraction $G_{16}$ which is directed in part along $G_{17}$ for the regeneration of a liquor containing ammonium carbonate and bicarbonate by blowing in $CO_2$ and, along $G_{18}$, to neutralise C the liquor emanating from the attack.

At the outlet of I the liquor $L_{10}$ is introduced at M where the ammonium sulphate is causticised by means of $Ca(OH)_2$ by a known method, thus giving a suspension $L_{13}$ of calcium sulphate in an ammoniacal liquor and the gaseous phase $G_{15}$ formed by ammonia gas which is passed along $G_{16}$, $G_{17}$ and $G_{18}$ in part toward regeneration K, in part toward neutralisation C.

The suspension $L_{13}$ which has left M is introduced at N where a solid phase $S_{14}$ formed by calcium sulphate which can be extracted is separated from a liquid phase $L_{14}$ constituted by an ammoniacal liquor passed into K in order to be recovered there.

As already mentioned, a liquor $L_3$ which has been freed from uranium and $SO_4^=$ ions but which still contains the carbonates and/or bicarbonates emanating from the attack, in solution, is collected at the outlet of D then introduced at E where it is thermally decomposed to liberate all the ammonia gas and a proportion of $CO_2$ as well as the water vapour originating from the decomposition of the ammonium carbonates and/or bicarbonates and a liquor $L_4$ containing the alkaline carbonates and/or bicarbonates is produced.

The liquor $L_4$ is passed into a concentration zone F where the alkaline carbonate and/or bicarbonate content is corrected so that the liquor $L_5$ leaving F and sent back to A has a suitable alkaline carbonate and/or bicarbonate content to allow the uraniferous ore to be attacked.

EXAMPLE (illustrated by the figure)

A uraniferous liquor $L_1$ obtained after the attack of the ore at A and separation of the sterile materials at B was treated in accordance with the process of the invention.

100 m$^3$/h of a solution having the following composition:

| Uranium | 2.1 g/l |
|---|---|
| $Na_2CO_3$ | 5.0 g/l |
| $NaHCO_3$ | 18.5 g/l |
| $Na_2SO_4$ | 21.3 g/l | was thus collected.

This liquor $L_1$ was introduced into C where it was neutralised by means of 374.4 kg/h of ammonia gas along $G_{18}$.

100 m$^3$/h of a neutralised liquor $L_2$ which had the following composition:

| Uranium | 2.1 g/l |
|---|---|
| $Na_2CO_3$ | 16.6 g/l |
| $(NH_4)_2CO_3$ | 10.6 g/l |
| $(Na_2)SO_4$ | 21.3 g/l | was obtained at the outlet of C.

This neutralised liquor $L_2$ was introduced into D at the inlet of a group of three ion-exchange columns initially charged with a strong anion-exchange resin of the quaternary ammonium type corresponding to the formula R—$(NH_3)_3HCO_3$, the first of these columns fixing the uranium and the $SO_4^=$ ions while the two other columns performed elution and rinsing.

100 m$^3$/h of a liquor $L_3$ which was free from uranium and $SO_4^=$ ions and had the following composition:

| $NaHCO_3$ | 44.1 g/l |
|---|---|
| $Na_2CO_3$ | 6.6 g/l |
| $(NH_4)_2CO_3$ | 10.6 g/l | were collected at the outlet of the ion-exchange column performing fixation.

At the outlet of D, this liquor $L_3$ was passed into E where thermal decomposition took place to the boiling point of the liquor giving:
on the one hand the mixture $G_6$ formed by 374.4 kg/h of ammonia gas and 242.3 kg/h of $CO_2$ gas and, on the other hand, 100 m$^3$/h of a liquor $L_4$ containing:

| $NaHCO_3$ | 53.4 g/l |
|---|---|
| $Na_2CO_3$ | 7.6 g/l |

The liquor $L_4$ was then concentrated at F so as to obtain a solution of an adequate concentration to carry out the attack.

At the same time, these two compounds were eluted by means of a liquor $L_7$ containing 158 g/l of $(NH_4)HCO_3$ at a flow rate of 30 m$^3$/h over the other two columns which were saturated in uranium and $SO_4^=$ ions during an earlier operation.

30 m$^3$/h of a liquor $L_8$ containing:

| Uranium | 7.0 g/l |
|---|---|
| $(NH_4)_2SO_4$ | 66.0 g/l |
| $(NH_4)_2CO_3$ | 30.4 g/l |
| $NH_4HCO_3$ | 19.7 g/l |

The liquor $L_8$ was then introduced into H where the uraniferous complex and the ammonium carbonate and bicarbonate present were thermally decomposed, giving 495 kg/h of ammonia gas, 863.6 kg/h of $CO_2$ gas and 15000 kg/h of water vapour along $G_{11}$.

The fraction $L_9$ leaving H was formed by a suspension of ammonium diuranate in an ammonium sulphate solution.

After separating the solid phase $S_{10}$ and liquid phase $L_{10}$,
275.3 kg/h of $U_2O_7(NH_4)_2$, representing the solid phase $S_{10}$,
15 m$^3$/h of a $(NH_4)_2SO_4$ liquor at 132 g/l for the liquid phase $L_{10}$, were obtained.

The cake $S_{10}$ was then introduced for calcination at J where the ammonium diuranate was thermally decomposed at a temperature slightly below 400° C. under the conditions known to the skilled man, giving:

| 252.3 kg/h | of $UO_3$ |
|---|---|
| 15.0 kg/h | of $NH_3$ represented | by $G_{12}$ recycled for the regeneration K of ammonium bicarbonate.

The liquor $L_{10}$ was passed to M for a causticisation treatment by addition of 1110 kg/h of $Ca(OH)_2$ under the conditions well known to the skilled man.

400 kg/h of ammonia gas, 374.4 kg/h of which were recycled via $G_{18}$ for neutralisation C and 25.6 kg/h via $G_{17}$ for regeneration K, on the one hand and
a suspension $L_{13}$ of $CaSO_4$ in an ammoniacal liquor, on the other hand, were thus obtained.

After separation of the solid phase $S_{14}$ and liquid phase $L_{14}$ at N, 2040 kg/h of $CaSO_4$ were obtained, representing the solid phase $S_{14}$ and 15 m$^3$/h of the liquor $L_{14}$ containing 7.3 g/l of ammonia expressed in the form of $NH_3$.

The gaseous fractions $G_6$, $G_{17}$ and $G_{11}$, the fraction $L_{14}$, increased by an addition of 15 m$^3$/h of water and 1534.1 kg/h of $CO_2$ to reconstitute the 30 m$^3$/h of liquor $L_7$ intended for elution at D, were therefore collected in the regeneration zone K.

It thus appears that the process according to the invention, as applied in this example, is particularly interesting since, starting from a sulphur-containing uraniferous ore, it has been possible to eliminate the sterile materials, to obtain uranium in oxidised form $UO_3$ and to extract the $SO_4^=$ ions corresponding to the sulphur initially contained in the ore in the form of a calcium sulphate precipitate, having the advantage of being able to be thrown into the environment without polluting it.

Consequently, it is no longer necessary to throw out liquid effluents containing sodium and ammonia since they are recycled integrally in the entire process.

I claim:

1. A process for the recovery of uraniferous and sulphur values from liquor resulting from the attack of sulphur containing uraniferous ores by an alkaline solution of sodium carbonate and/or bicarbonate wherein the resulting liquor contains sodium carbonate and/or bicarbonate and sodium sulphate in addition to uranium values, the steps of
   (1) introducing ammonia into the liquor whereby any $HCO_3^-$ is converted to $CO_3^=$;
   (2) contacting the neutralized liquor from step (1) with an anion exchange resin to fix the uranium and $SO_4^=$ ions, leaving a liquor containing ammonia, sodium carbonate and/or bicarbonate in solution;
   (3) eluting the uranium and $SO_4^=$ ions fixed on the ion exchange resin with an ammonia carbonate and/or bicarbonate solution to yield a solution of ammonium uranyl carbonate complex and ammonium sulphate;
   (4) subjecting the solution to thermal treatment until a suspension of precipitated ammonium uranate and/or diuranate is obtained in a solution of the ammonium sulphate while $CO_2$, $NH_3$ and $H_2O$ are vaporized off;
   (5) separating the precipitated ammonium uranate and/or diuranate from the solution of ammonium sulphate from step (4);
   (6) calcining the separated ammonium uranate and/or diuranate to yield uranium oxide ($UO_3$) and $NH_3$ vapors.

2. A process as claimed in claim 1 in which the ammonia introduced liquor in step (1) is ammonia gas or ammonia liquor.

3. A process as claimed in claim 1 in which the ion exchange in step (2) is carried out at a temperature within the range of ambient temperature to 60° C.

4. A process as claimed in claim 1 in which the ion exchange resin is in carbonated or bicarbonated form.

5. A process as claimed in claim 1 in which the solution with which the ion exchange resin is eluted in step (3) contains ammonium carbonate and/or bicarbonate in a concentration within the range of 1-2.5 M.

6. A process as claimed in claim 1 in which the elution in step (3) is carried out at a temperature within the range of ambient temperature to 60° C.

7. A process as claimed in claim 1 in which the $CO_2$ and $NH_3$ vaporized off in step (4) are cycled for regeneration of ammonium carbonate and/or bicarbonate.

8. A process as claimed in claim 1 in which the $NH_3$ released during the calcination of the ammonium uranate and/or diuranate in step (6) is joined with the $CO_2$ and $NH_3$ from step (4) for the regeneration of ammonium carbonate and/or bicarbonate.

9. A process as claimed in claim 1 which includes the steps of
   (7) adding lime to the liquor separated in step (5) resulting in the liberation of $NH_3$ and precipitation of the $SO_4^=$ to ions as $CaSO_4$ in an ammoniacal liquor, and
   (8) separating the $CaSO_4$ from the ammoniacal liquor.

10. A process as claimed in claim 9 in which the ammoniacal liquor separated in step (8) and the $NH_3$ liberated in step (7) are cycled for combination with the $NH_3$ from steps (4) and (6) for regeneration of ammonium carbonate and/or bicarbonate.

11. A process as claimed in claim 1 which includes the steps of:
   (9) thermally treating the elutant liquor from step (2) to drive off $NH_3$ and a portion of the $CO_2$ and $H_2O$, leaving a liquor containing only alkaline carbonates and/or bicarbonates,
   (10) concentrating the liquor from step (9), and
   (11) recycling the concentrated liquor to form a part of the liquor for attacking of the ore.

12. A process as claimed in claim 11 in which the $NH_3$ and $CO_2$ liberated in step (9) is cycled for combination with the ammonia liquor from step (8) and the $NH_3$ liberated in steps (4) and (6) to regenerate ammonium carbonate and/or bicarbonate.

13. A process as claimed in claim 11 in which the liquor is concentrated in step (10) to between 150 g/l to the saturation point for the alkaline carbonates and/or bicarbonates.

14. A process as claimed in claim 12 which includes the step of:
   (12) introducing carbonate dioxide for reaction with the $NH_3$ and $CO_2$ liberated in step (9), the ammonia liquor from step (8) and the $NH_3$ liberated in steps (4) and (6) to regenerate ammonium carbonate and/or bicarbonate.

15. A process as claimed in claim 1 in which the anion exchange resin in step (2) is of the $R-N(CH_3)_3^+$ type.

16. A process as claimed in claim 1 in which the solution containing the uranium complex is heated in step (4) to the boiling temperature of the solution.

* * * * *